United States Patent [19]

Köhnlechner

[11] Patent Number: 4,563,902
[45] Date of Patent: Jan. 14, 1986

[54] PRESSURE AND TEMPERATURE SENSOR

[75] Inventor: Rainer Köhnlechner, Schloss-Holte, Fed. Rep. of Germany

[73] Assignee: Ermeto Armaturen GmbH, Bielefeld, Fed. Rep. of Germany

[21] Appl. No.: 599,393

[22] Filed: Apr. 12, 1984

[51] Int. Cl.⁴ .............................................. G01L 9/06
[52] U.S. Cl. ...................................... 73/708; 73/706; 73/727; 338/4; 374/143
[58] Field of Search ................ 73/706, 708, 727, 721, 73/726, 720, 754, DIG. 4; 338/4, 42; 374/143

[56] References Cited

U.S. PATENT DOCUMENTS 3,198,013 8/1965 Erdely ............................ 73/DIG. 4
3,237,138 2/1966 Koolman et al. ...................... 338/4

Primary Examiner—Donald O. Woodiel
Attorney, Agent, or Firm—F. L. Tolhurst

[57] ABSTRACT

A pressure measuring device wherein a housing (1) includes a pressure sensor (2) in a pressure chamber (4) and an electronic circuit (14) in a non-pressurized chamber (6). Borings (7) extend between pressure chamber (4) and non-pressurized chamber (6) and accommodate contacts that electrically connect pressure sensor (2) and electronic circuit (14). A pressure membrane (3) cooperates with housing (1) to further define pressure chamber (4) and isolate the device from the fluid system. Pressure chamber (4) is filled with a medium that transmits the system pressure to pressure sensor (2). Pressure sensor (2) measures the pressure and provides an output signal to electronic circuit (14).

6 Claims, 2 Drawing Figures

PRESSURE AND TEMPERATURE SENSOR

BACKGROUND OF THE INVENTION

1. Field of the Invention

The subject invention is directed to devices for measuring pressure, especially high pressures, and temperatures in a hydraulic or pneumatic system. More specifically, the subject invention concerns devices that incorporate both a piezo-resistive pressure measuring cell and an electronic circuit in one housing to form an integral component.

2. Description of the Prior Art

The usual types of manometers known in the prior art are generally read off only at intervals. Furthermore, such devices are frequently inadequate with regard to the precision required for certain measurements. In contrast, electronic measuring devices afford a continuous recording of the measured values and a rapid processing of the signals with a high degree of measuring accuracy.

Hydraulic systems are becoming increasingly complicated in the course of the rapid technical development. One consequence of this is that the hydraulic systems are placing increasingly higher demands on the required accuracy and switching speed of associated systems. As a result, there is a demand for improved pressure and temperature measuring devices that will not only continuously indicate the actual values measured by the electronic circuit, but will also give an instantaneous or real-time indication, of interference in the installation.

In piezo-resistive pressure measuring cells known in the prior art, the piezo-resistive semiconductor element (silicium chip) that is used for recording the pressure is connected to the corresponding contacts by means of binding wires. Thus, the entire sensor housing is standardized from semiconductor technology and is similar to that used for transistors, operational amplifiers, and the like. Consequently, such prior art sensor housing are unsuitable for measuring high pressures because the pressure influence on the housing distorts the measurement. Moreover, the housing often cannot withstand the higher pressures that are to be measured such that it is subject to deformation.

Pressure sensors are subject to thermal drift. This can be compensated for by measuring the temperature and adjusting the pressure sensor in accordance with the temperature changes. However, it is very important to adjust the pressure sensor on a continuous basis, particularly if the temperature changes are rapid.

In known hydraulic or pneumatic systems where pressure is monitored, the temperature is measured remotely from the pressure measurement. The pressure sensor is adjusted for temperature according to discrete units of temperature. This process creates errors; first because the temperature is not measured at the same time and location as the measurement of pressure, and second because rapid fluctuations of the remotely measured temperature induce a phase lag. Furthermore, the discrete temperature units permit only an approximate adjustment of the pressure sensor.

Thus, there was a need in the prior art for a device that would measure high pressure and temperature simultaneously to substantially improve the measurement accuracy through continuous temperature compensation.

There was also a need in the prior art for a measuring device that would provide a precise measurement that can readily be connected and assembled to hydraulic or pneumatic systems under high pressure.

SUMMARY OF THE INVENTION

In accordance with the subject invention, a threaded housing is divided into a pressure chamber and a non-pressurized chamber. The pressurized chamber contains a pressure sensor and the non-pressurized chamber contains an electronic circuit. A pressure-transmitting membrane separates the pressure chamber from the pressure system. The pressure chamber is connected to the non-pressurized chamber by borings for electrical contacts or connecting posts. The pressure chamber also contains a temperature sensor that is also connected to the electronic circuitry to continuously measure the temperature in the pressure chamber and to concurrently use the measured temperature to adjust the temperature coefficient for the pressure sensor.

Preferably, the pressure sensor and the temperature sensor are located directly on or adjacent to the wall of the threaded housing that separates the pressure chamber from the non-pressurized chamber.

Also preferably, the electronic circuit is a hybrid amplifier that amplifies low level output signals from the pressure sensor. The electronic circuit also includes circuitry to adjust the output of the pressure sensor in response to the measured temperature.

Most preferably, the borings accommodating the electrical contacts or connecting posts are conical whereby the diameter of the boring decreases in the direction from the pressure chamber to the non-pressurized chamber, and the electrical contacts or connecting posts are insulated from the wall of the boring by a glass filling.

Other details, objects and advantages of the invention will become apparent as the following description of a presently preferred embodiment thereof proceeds.

BRIEF DESCRIPTION OF THE DRAWINGS

The accompanying drawings show a presently preferred embodiment of the subject invention wherein.

DESCRIPTION OF THE PREFERRED EMBODIMENT

Figure 1:
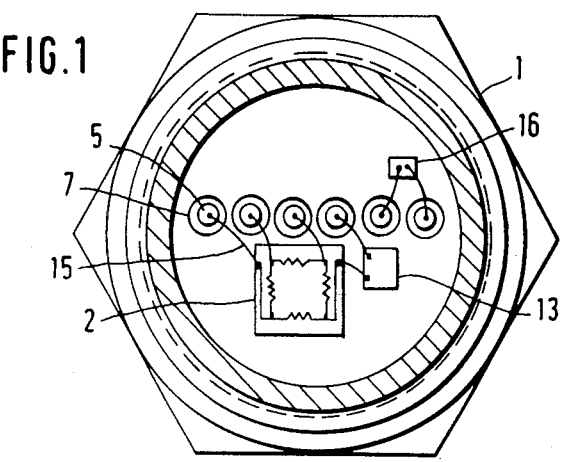
FIG. 1 shows a radial cross section of the preferred embodiment taken through the threaded housing.
Figure 2:
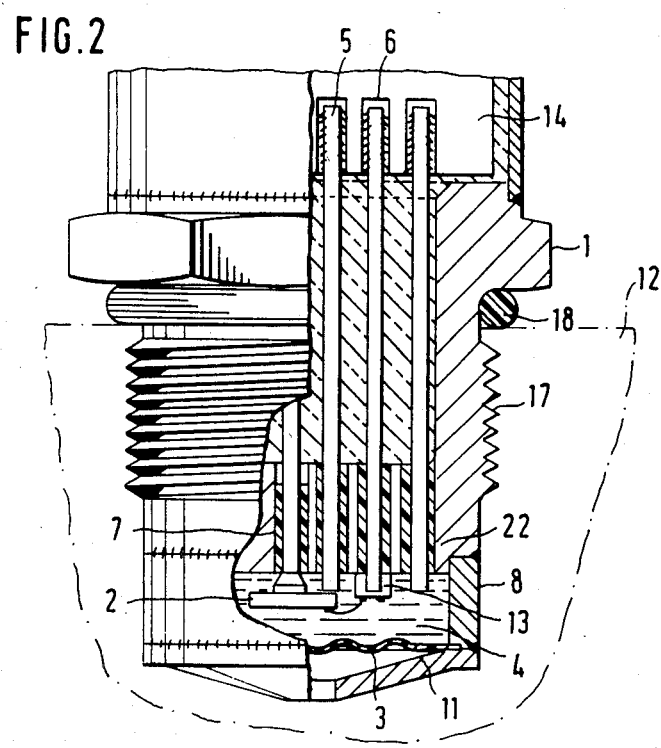
FIG. 2 shows a partial longitudinal section of the embodiment shown in FIG. 1.

As shown in FIGS. 1 and 2, the disclosed device for measuring high pressures and temperatures includes a threaded housing 1 having a pressure chamber 4 and a non-pressurized chamber 6. Borings 7 are located between pressure chamber 4 and non-pressurized chamber 6 and are aligned substantially parallel to the longitudinal axis of threaded housing 1.

Housing 1 includes a ring 8 and a conically increasing cover plate 11. Housing 1 cooperates with a pressure-transmitting membrane 3 that is welded between rings 8 and cover plate 11 to define pressure chamber 4. Housing 1 is also provided with a screw thread 17 and with an adjacently located o-ring 19 such that it can be threadingly connected to an adapter and, thereby, secured to a pressurized fluid system. Pressure-transmitting membrane 3 isolates pressure chamber 4 from the fluid system and cover plate 11 protects membrane 3 from being mechanically damaged.

Pressure chamber 4 contains an analog pressure sensor 2, analog temperature sensor 16, and a pressure switch 13. The balance of pressure chamber 4 is filled with chemically inert, electrically insulating, separating fluid that provides for a pressure conversion in a ratio of substantially 1:1.

Pressure sensor 2 is mounted on a connecting post that is located in one of borings 7. Connecting post 5 is provided with a head at the end adjacent pressure chamber 4. Mounting sensor 2 on connecting post 5 in this way makes pressure sensor 2 more sensitive to the pressure waves transmitted through the insulating fluid with less interference.

In the example of FIGS. 1 and 2, pressure switch 13 and temperature sensor 16 are connected to the wall of housing 1. Temperature sensor 16 continuously adjusts the output of the pressure measuring device in response to changes in the temperature of the pressure transmitting fluid in pressure chamber 4. Pressure switch 13 is a foil pressure switch that is electrically connected to an electrical circuit that is connected to the electrical circuit of the pressure sensor. Pressure switch 13 has a specific, low switching pressure that is adjustable. The electrical circuit includes electrical resistors that are combinable to adjust the zero point of pressure sensor 2.

Pressure sensor 2, pressure switch 13 and temperature sensor 16 are electrically connected through electrical leads 15 and electrical contacts to an electronic circuit 14 that is located in non-pressurized chamber 6. Electronic circuit 14 is a hybrid amplifier that amplifies the relatively low output signals provides by pressure sensor 2.

The electrical contacts are located in a plurality of borings 7 that are arranged in a straight line. The linear arrangement of the electrical contacts thus provides is in contrast to conventional plug as known in the prior art and provides an arrangement of electrical contacts that it compatible with electronic circuit 14.

The electrical contacts and connecting posts 5 are insulated from the wall of borings 7 by a pressure-proof insulation of glass filling. Housing borings 7 that accommodate the electrical contacts and the connecting posts 5 are conically shaped with the boring diameter decreasing in the direction from pressure chamber 4 to non-pressurized chamber 6. In the disclosed embodiment, the taper is at a ratio of substantially 1:50. This conical shape supports against the pressure in pressure chamber 4 and protects the disclosed device against large pressure differentials between pressure chamber 4 and non-pressurized chamber 6.

In the operation of the embodiment of FIGS. 1 and 2, the piezo-resistive pressure sensor and the semiconductor chip 2 measures the system pressure that is transmitted at a 1:1 ratio through membrane 3 and the insulating fluid in pressure chamber 4. Sensor 2 converts the measured pressure to a proportional voltage. The voltage output of sensor 2 is then amplified by integrated amplifier 14.

The integrated arrangement of the sensor 2 and the amplifier 14 in housing 1 of the disclosed device provides short electrical connections between the sensor and the amplifier so that low-level signals can be better received and amplified. This arrangement, together with the mounting of sensor 2 on connecting post 5, provides a signal level that is particularly free from interference. Thus, the preferred embodiment of the subject invention can continuously and simultaneously detect and measure small changes in both pressure and temperature.

Experimental results of the subject invention show that measuring ranges go up to nominal pressures of 440 bar with 100% overload stability. Peak pressures of up to 600 bar can be covered with the temperature ranging between −20° C. to +120° C.

While a presently preferred embodiment of the subject invention is shown and described herein, the subject invention is not limited thereto, but can be otherwise variously embodied within the scope of the following claims.

I claim:

1. A device for measuring pressure and temperature in a fluid system, said device comprising:
   a housing having a pressure chamber and a non-pressurized chamber, said pressure chamber being connected to said non-pressurized chamber by borings;
   electrical contacts and connecting posts that are located in said borings:
   an electronic circuit that is located in the non-pressurized chamber of said housing and that is electrically connected to said electrical contacts;
   a pressure sensor located in the pressure chamber of said housing and that is electrically connected to said electrical contacts;
   a pressure transferring membrane that separates said pressure chamber from the fluid system;
   an incompressible, pressure transmitting medium that fills said pressure chamber; and
   a temperature sensor located in said pressure chamber and electrically connected to the electronic circuit, said temperature sensor being continuously responsive to the temperature of the pressure transmitting medium to adjust the output of the pressure measuring device.

2. The measuring device of claim 1 wherein said pressure sensor and said temperature sensor are located adjacent the wall of said housing that separates the pressure chamber from the non-pressurized chamber.

3. The measuring device of claim 2 wherein the electronic circuit is a hybrid amplifier that amplifies output signals from the pressure sensor, said electronic circuit including circuitry for adjusting the output of the electronic circuit in response to the output of the temperature sensor.

4. The measuring device of claim 1 wherein the borings that accommodate the electrical contacts and connecting posts are conical with the diameter of the boring decreasing in the direction from the pressure chamber to the non-pressurized chamber, and wherein the electrical contacts and connecting posts are insulated from the boring wall by a glass filling.

5. The measuring device of claim 1, 2, 3, or 4 wherein the housing is arranged for threading engagement with an adapter that is constructed for coupling the measuring device to a fluid system.

6. The measuring device of claim 1, 2, 3, 4 wherein the device comprises a hand-held measuring set.

* * * * *